April 6, 1937.    R. SWANSON    2,076,520
AUTOMATIC AIR MOTOR GOVERNOR
Filed Jan. 21, 1936
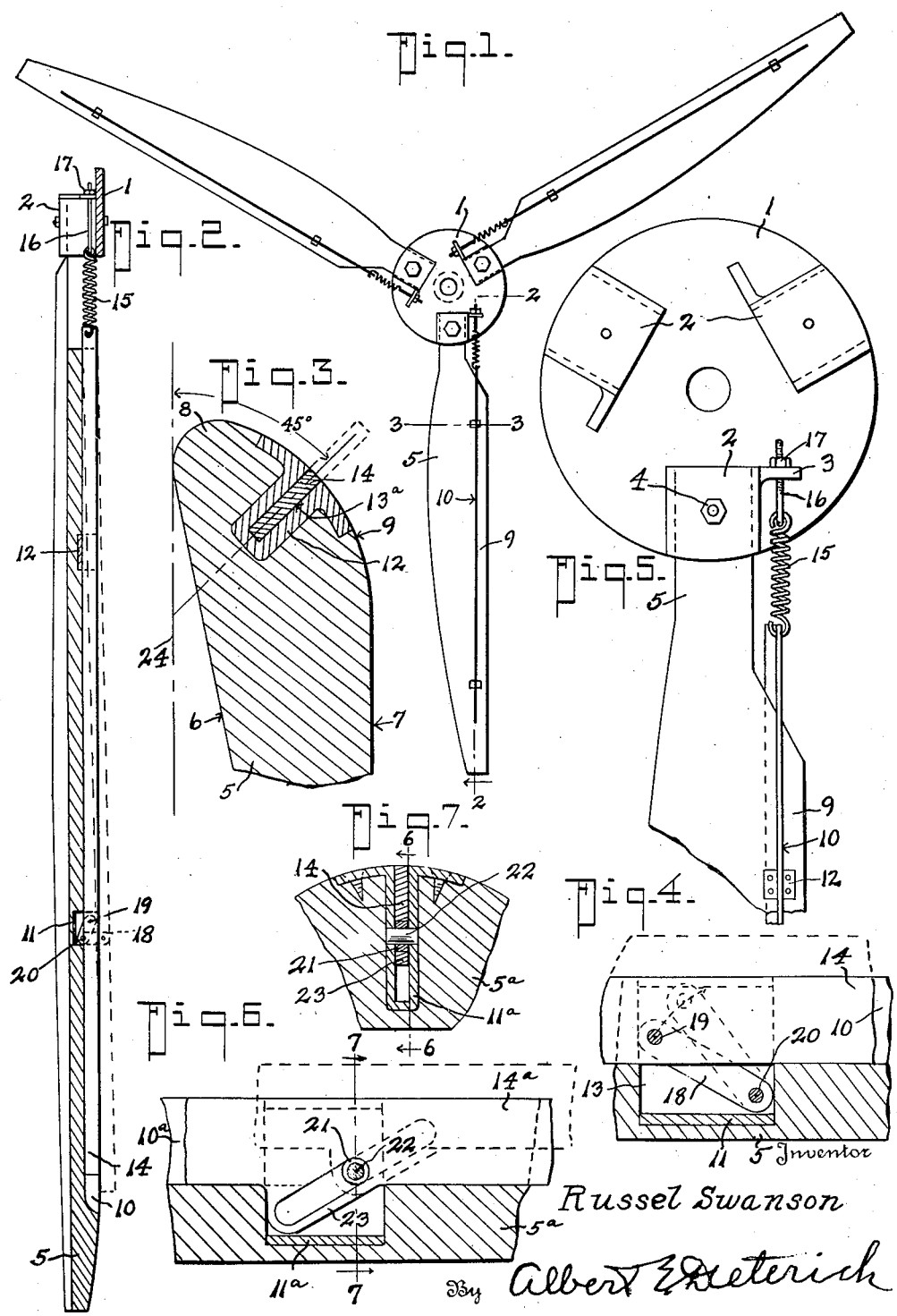
Inventor
Russel Swanson
By Albert E. Dieterich
Attorney Patented Apr. 6, 1937

2,076,520

UNITED STATES PATENT OFFICE 2,076,520

AUTOMATIC AIR MOTOR GOVERNOR

Russel Swanson, Cleghorn, Iowa, assignor of one-third to L. H. Cutler and one-third to Oscar E. Johnson Application January 21, 1936, Serial No. 60,117

21 Claims. (Cl. 170—170)

My invention, which relates to air or wind motors, especially has for its object to provide an automatically actuated governor for the propeller to operate an electric generator at substantially constant speed regardless of wind velocity changes between predetermined limits.

It is a further object of the invention to provide a propeller having a self-contained means actuated by centrifugal force under increased speed of rotation of the propeller for restraining the propeller so that it may be driven at a predetermined maximum rate under a wind pressure that would otherwise turn the propeller at a ruinous rate.

Again, it is an object to provide the propeller of a wind motor with an automatically actuated brake, as a part of the propeller blades, to retard the speed of the propeller when the propeller is under the influence of excessive wind velocity.

A further object is to provide a propeller the blades of which on their back, or airfoil, surface are provided with automatically operable means to disrupt the smooth flow of air (slip stream) and break up the vacuum produced back of the blades by the motion of the propeller, which in turn will retard the speed of the propeller within a given limit when the wind velocity exceeds a predetermined degree.

It is to be further noted that, in speed controlling governors actuated by centrifugal force the use of the conventional fly-ball governor with means for transmitting the action of the fly-ball to the final controlling member is the common practice. In my invention, the final controlling member, in addition to performing its own function, also takes the place of the fly-ball and the means used to transmit the action of the fly-ball to the final controlling member, thereby simplifying the construction and eliminating the inefficiency and sluggish action common to all governors composed of more parts.

Other objects will in part be obvious and in part be pointed out hereinafter.

To the attainment of the aforesaid objects and ends the invention still further resides in the novel details of construction, combination and arrangement of parts, all of which will be first fully described in the following detailed description, and then be particularly pointed out in the appended claims, reference being had to the accompanying drawing, in which:—

Figure 1 is a rear elevation of a three-blade propeller showing the application of my invention.

Figure 2 is an enlarged sectional view on the line 2—2 of Figure 1.

Figure 3 is a magnified detail cross section on the line 3—3 of Figure 1.

Figure 4 is an enlarged detail longitudinal section of a portion of the invention.

Figure 5 is an enlarged detail elevation of the hub and a portion of one blade.

Figure 6 is a longitudinal section on the line 6—6 of Figure 7, showing a modification of the invention.

Figure 7 is a cross section on the line 7—7 of Figure 6.

In the drawing, in which like numerals of reference indicate like parts in all the figures, 1 represents the hub of the propeller, which hub is provided with sockets 2 in which the shanks of the propeller blades 5 are rigidly secured by bolts and nuts 4, or in any other suitable way. Each socket 2 is provided with a projection 3 for a purpose presently explained.

Each propeller blade has its front or windward face inclined at an angle to the plane of rotation or face of the propeller hub, as indicated by the dot and dash line 24, in Figure 3, while its rear face 7 is, in general, parallel to the plane of rotation.

8 designates the nose or leading edge of the propeller which is rounded and merges with the curved portion 9 that joins with the rear face 7, the surfaces 9 and 7 constituting the airfoil surface.

Each propeller blade 5 is provided with a longitudinal recess or groove 10 in which is located a governor bar 14.

11 and 12 are U-shaped guides sunk into the propeller blades and having spaces 13—13a respectively for the reception of the governor bar 14. The U-shaped guides 11 and 12 are secured in place by screws or other suitable means.

15 designates the governor springs, there being one provided for each governor bar. Each spring 15 is connected to its respective governor bar and to an adjusting bolt 16 which passes through an ear 3 and carries an adjusting nut 17. Each governor bar 14 is also connected to its respective propeller blade by a connection which will permit the spring 15 to pull the governor bar into its groove 10 with its outer edge flush with the face 9 of the propeller blade while the propeller is turning under normal wind velocity and will permit the governor bar 14 to be projected from its groove 10 and moved longitudinally against the tension of the spring 15 by centrifugal force when the propeller is turning at a speed greater than its normal speed.

In the drawing I have shown two means for connecting the governor bar with the propeller blade. The means shown in Figures 1 to 4 inclusive consists of a pair of links 18 pivoted at 19 to the bar 14 and at 20 to the U-shaped member 11 that is set in blade 5, these links lying within the U-shaped member 11 (the member that is nearest the tip of the blade), this member being, of course, provided with a wider space 13 to accommodate the links than is the space 13a of the member 12.

The other method of connecting the bar with the blade is shown in Figures 6 and 7. According to this construction the blade 14a is provided with a slotted projection 23 through which passes a pin 22 carrying a roller 21, the pin being mounted in the U-shaped member 11a (see Figure 7). In Figures 6 and 7 those parts which correspond to like parts in the preceding figures bear the same reference numerals plus the index letter a.

As shown in detail in Figure 3, the groove 10 in which the bar 14 is located lies at an angle of approximately 45 degrees to the plane 24, this having been found to be the preferable angle to obtain the most effective operation.

Experimentation has shown that an obstruction on the airfoil side of a propeller blade at the proper point and at a right angle to the surface from which it protrudes will disrupt the smooth flow of air and break up the vacuum produced back of the blades by the motion of the propeller, which in turn reduces the speed of the propeller, or rather retards the speed within a given limit. As the natural wind pressure varies greatly and the speed of the air driven propeller fluctuates with the variation of the wind pressure, it is obvious that a successful governor for controlling the speed of an air driven propeller must be automatically operative under wind variation. The present invention provides such a governor. For example: the tension springs 15 are set to hold the speed of the propeller under 300 R. P. M., or other desired speed; should the wind pressure be such as to force the propeller beyond that speed, the increased centrifugal force would cause the governor bar 14 to move out from the blade and, through the action of the connecting links 18 or the slotted extension 23, as the case may be, gradually to rise out of the recess in the propeller blade and form the obstruction necessary to break up the smooth flow of air over the airfoil side of the propeller blade, which in turn will disrupt the vacuum back of the propeller and retard its speed. The governor bar projects and recedes with the rise and fall of wind pressure to hold the speed of the propeller at a predetermined rate.

From the foregoing description, taken in connection with the accompanying drawing (which shows the preferred embodiment of the invention) it is thought that the construction, operation and advantages of the invention will be clear to those skilled in the art, and I desire it to be understood that changes in the details of construction and arrangement of parts may be made without departing from the spirit of the invention or the scope of the appended claims.

In the foregoing specifications I have described my invention in an automatic air motor governor; pointed out is meritorious principles and its advantages in simplified construction and operating efficiency.

What I claim is:

1. In an air motor, a propeller having a plurality of blades, air-resistant means carried by said blades and wholly located on the airfoil side of the blades, and means holding said air-resistant means inactive when the propeller is rotating below a predetermined rate of speed, said air-resistant means being constructed to assume active positions through the action of centrifugal force when the propeller is in motion for controlling the speed of rotation of said propeller within a predetermined limited rate of speed.

2. In an air motor, a propeller having rigid blades, and a centrifugal-force actuated governor located wholly on the airfoil side of the blades and having provisions for controlling the speed of the propeller within a predetermined limited rate of speed.

3. In an air motor having a propeller with blades; the combination with a blade having a groove in the airfoil side only of the blade, of a governor contained within said groove, and means by which the speed of the propeller automatically actuates the governor and in a reciprocal manner the governor automatically controls the speed of the propeller within a predetermined limited rate of speed.

4. In an air motor, a propeller having a plurality of blades, at least one of which has a longitudinal recess in the airfoil side of the blade, an automatic speed governor consisting of a governor bar mounted within said longitudinal recess, and yieldable means for holding said bar pocketed in said recess and projectible from said recess by centrifugal force upon excessive speed of rotation of the propeller to restrain said propeller to speeds below a predetermined maximum under excessive wind velocity.

5. In a wind motor, a propeller having blades at least one of which is provided with a longitudinal recess in its airfoil side, a governor bar located within said recess, means connecting said bar to said blade in virtue of which said bar may be moved outwardly from said recess, and yieldable means continuously tending to retract and hold said bar within said recess, all being arranged substantially as shown and for the purposes described.

6. In a wind motor, a propeller having blades at least one of which is provided with a longitudinal recess in its airfoil side, a governor bar located within said recess, means connecting said bar to said blade in virtue of which said bar may be moved outwardly from said recess and longitudinally of the blade, and yieldable means continuously tending to retract and hold said bar within said recess, all being arranged substantially as shown and for the purposes described.

7. In a wind motor, a propeller having blades at least one of which is provided with a longitudinal recess in its airfoil side, a governor bar located within said recess, means connecting said bar to said blade in virtue of which said bar may be moved outwardly from said recess, and yieldable means continuously tending to retract and hold said bar within said recess, said connecting means including a link connected to said bar and to said blade.

8. In a wind motor, a propeller having blades at least one of which is provided with a longitudinal recess in its airfoil side, a governor bar located within said recess, means connecting said bar to said blade in virtue of which said bar may be moved outwardly from said recess, and yieldable means continuously tending to retract and hold said bar within said recess, said connecting means including an inclined slot in the bar and a movement-limiting member carried by the blade and passing through the slot.

9. In a wind motor, a propeller having blades at least one of which is provided with a longitudinal recess in its airfoil side, a governor bar located within said recess, means connecting said bar to said blade in virtue of which said bar may be moved outwardly from said recess, and yieldable means continuously tending to retract and hold said bar within said recess, said connecting means including a link connected to said bar and to said blade, and said yieldable means comprising a spring connected to the bar and means to adjust the tension of said spring.

10. In a wind motor, a propeller having blades at least one of which is provided with a longitudinal recess in its airfoil side, a governor bar located within said recess, means connecting said bar to said blade in virtue of which said bar may be moved outwardly from said recess, and yieldable means continuously tending to retract and hold said bar within said recess, said connecting means including an inclined slot in the bar and a movement-limiting member carried by the blade and passing through the slot, and said yieldable means comprising a spring connected to the bar and means to adjust the tension of said spring.

11. A wind motor propeller comprising a hub having sockets, a set of blades held in said sockets, each blade having on its airfoil side a longitudinal groove, a governor bar located in each groove with its outer edge flush with the airfoil face of said blade, means connecting said bars with their respective blades in virtue of which the bars may be moved outwardly and longitudinally of the blades, a spring connected to each bar, and a spring tension adjusting means on the hub for each spring to which adjusting means the springs are respectively attached.

12. A wind motor propeller comprising a hub having sockets, a set of blades held in said sockets, each blade having on its airfoil side a longitudinal groove, a governor bar located in each groove with its outer edge flush with the airfoil face of said blade, means connecting said bars with their respective blades in virtue of which the bars may be moved outwardly and longitudinally of the blades, a spring connected to each bar, and a spring tension adjusting means on the hub for each spring to which adjusting means the springs are respectively attached, said connecting means comprising links, one on each side of the bar and pivotally connected to the blade and to the bar.

13. A wind motor propeller comprising a hub having sockets, a set of blades held in said sockets, each blade having on its airfoil side a longitudinal groove, a governor bar located in each groove with its outer edge flush with the airfoil face of said blade, means connecting said bars with their respective blades in virtue of which the bars may be moved outwardly and longitudinally of the blades, a spring connected to each bar, and a spring tension adjusting means on the hub for each spring to which adjusting means the springs are respectively attached, said connecting means comprising an inclined slot in the bar and a cross pin carried by the blade which pin passes through said slot.

14. A wind motor propeller comprising a hub having sockets, a set of blades held in said sockets, each blade having on its airfoil side a longitudinal groove, a governor bar located in each groove with its outer edge flush with the airfoil face of said blade, means connecting said bars with their respective blades in virtue of which the bars may be moved outwardly and longitudinally of the blades, a spring connected to each bar, and a spring tension adjusting means on the hub for each spring to which adjusting means the springs are respectively attached, said connecting means comprising an inclined slot in the bar and a cross pin carried by the blade which pin passes through said slot and carries a roller in the slot.

15. A wind motor propeller comprising a hub having sockets, a set of blades held in said sockets, each blade having on its airfoil side a longitudinal groove, a governor bar located in each groove with its outer edge flush with the airfoil face of said blade, means connecting said bars with their respective blades in virtue of which the bars may be moved outwardly and longitudinally of the blades, a spring connected to each bar, and a spring tension adjusting means on the hub for each spring to which adjusting means the springs are respectively attached, said grooves and bars being located to lie at angles of approximately 45 degrees to the plane of the face of the hub.

16. In an air motor, a propeller having a plurality of blades, air-resistant means carried by said blades and wholly located on the airfoil side of the blades, and means holding said air-resistant means inactive when the propeller is rotating below a predetermined rate of speed, said air-resistant means being constructed to assume active positions through the action of centrifugal force when the propeller is in motion, in virtue of which the speed of the propeller is automatically actuated by the variable pressure of air or wind on the propeller effecting control of rotation of said propeller within a predetermined rate of speed.

17. In an air motor of a wind driven propeller type having a plurality of propeller blades: an automatic speed governor located wholly on the airfoil side of the blades, coordinated automatic action between said propeller and said governor, in which the rotating speed of said propeller automatically actuates said governor and in a reciprocal action said governor automatically controls the rotating speed of said propeller within a predetermined limited rate of speed.

18. In combination with an air motor of a wind driven propeller type having a plurality of propeller blades, an automatic speed governor consisting of a governor bar mounted within a longitudinal recess formed in the airfoil side of propeller blade with connecting links on either side of said bar, one end of said links pivotally attached to said propeller blade and the opposite end of said links pivotally attached to said governor bar in a manner effecting the control of the longitudinal and lateral movements of said governor bar in its reciprocal movement between the centrifugal force induced by the rotating speed of said propeller and the opposing pull of an adjustable tension spring interposed between and attached to said propeller and said governor bar; thereby effecting the sensitive automatic reciprocal action that moves the governor bar in and out of contact with the wind flowing over the airfoil or back side of propeller blades, said contact varying with the wind pressure to control the rotation of the propeller within a predetermined rate of speed.

19. In an air motor having a propeller with blades; the combination with solid blades each having a longitudinal groove in the air foil side only of the blade, of a governor contained within each groove and including means by which the speed of the propeller automatically actuates the governor and in a reciprocal manner the governor automatically controls the speed of the propeller within a predetermined limited rate of speed.

20. In an air motor, a propeller having blades, a speed controlling governor therefor carried by and located wholly on the airfoil side of said blades and including a final controlling member automatically functioning in itself through centrifugal force exerted on it by the speed of the turning propeller.

21. In a speed controlling governor for wind motors having turning parts, a final controlling member located exclusively on the airfoil side of the turning parts constructed to be actuated through centrifugal force directly applied to it by the speed of the turning parts which it controls.

RUSSEL SWANSON.